UNITED STATES PATENT OFFICE.

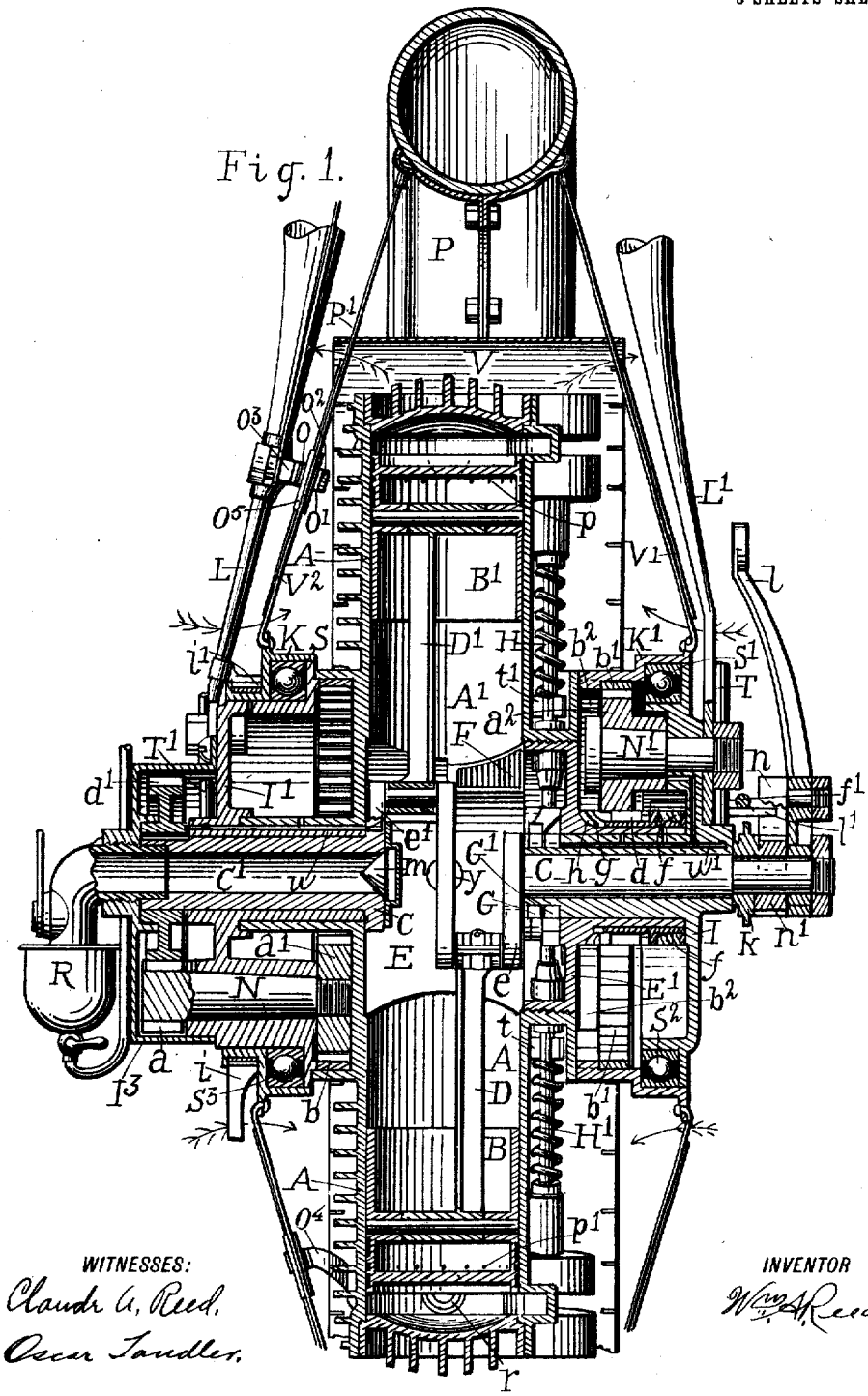

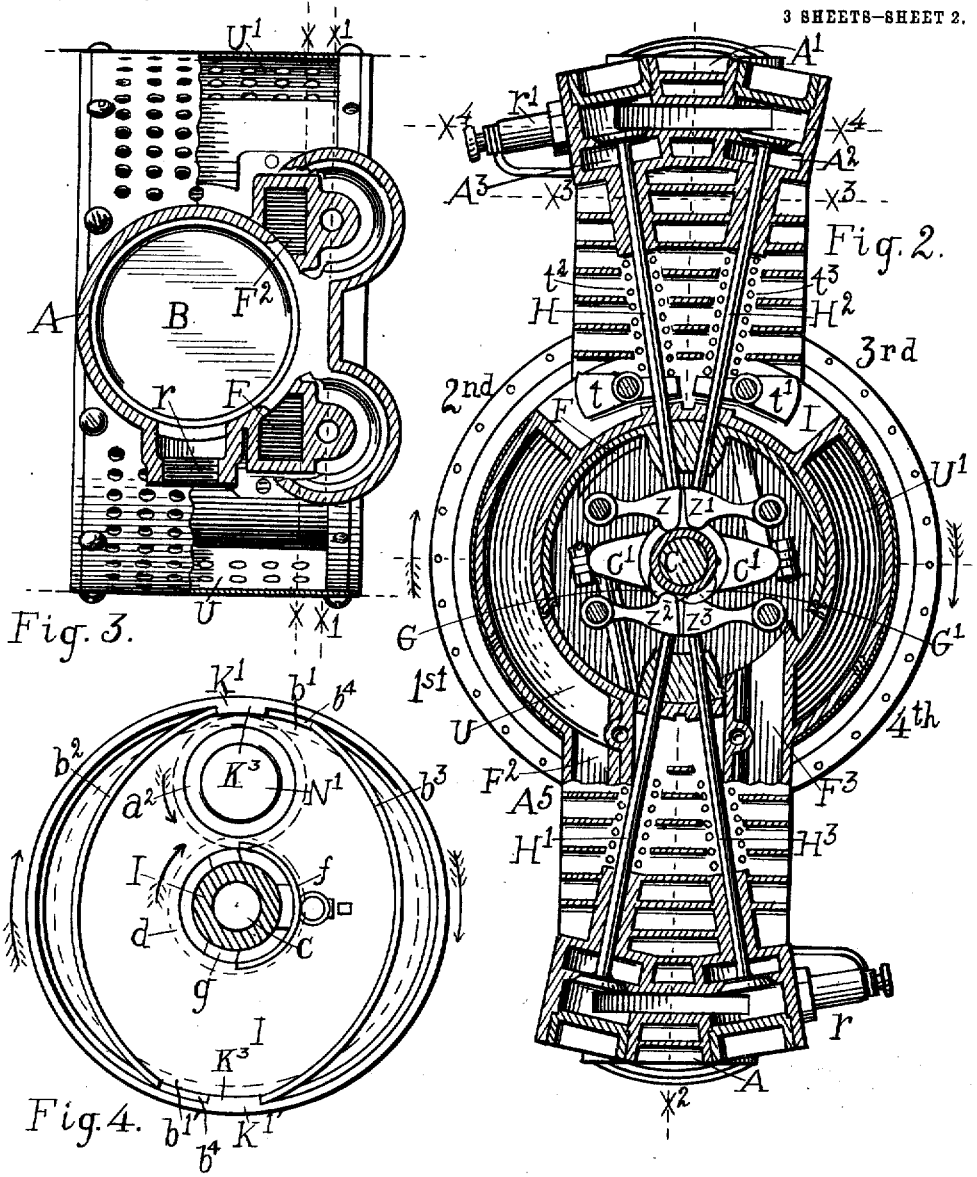

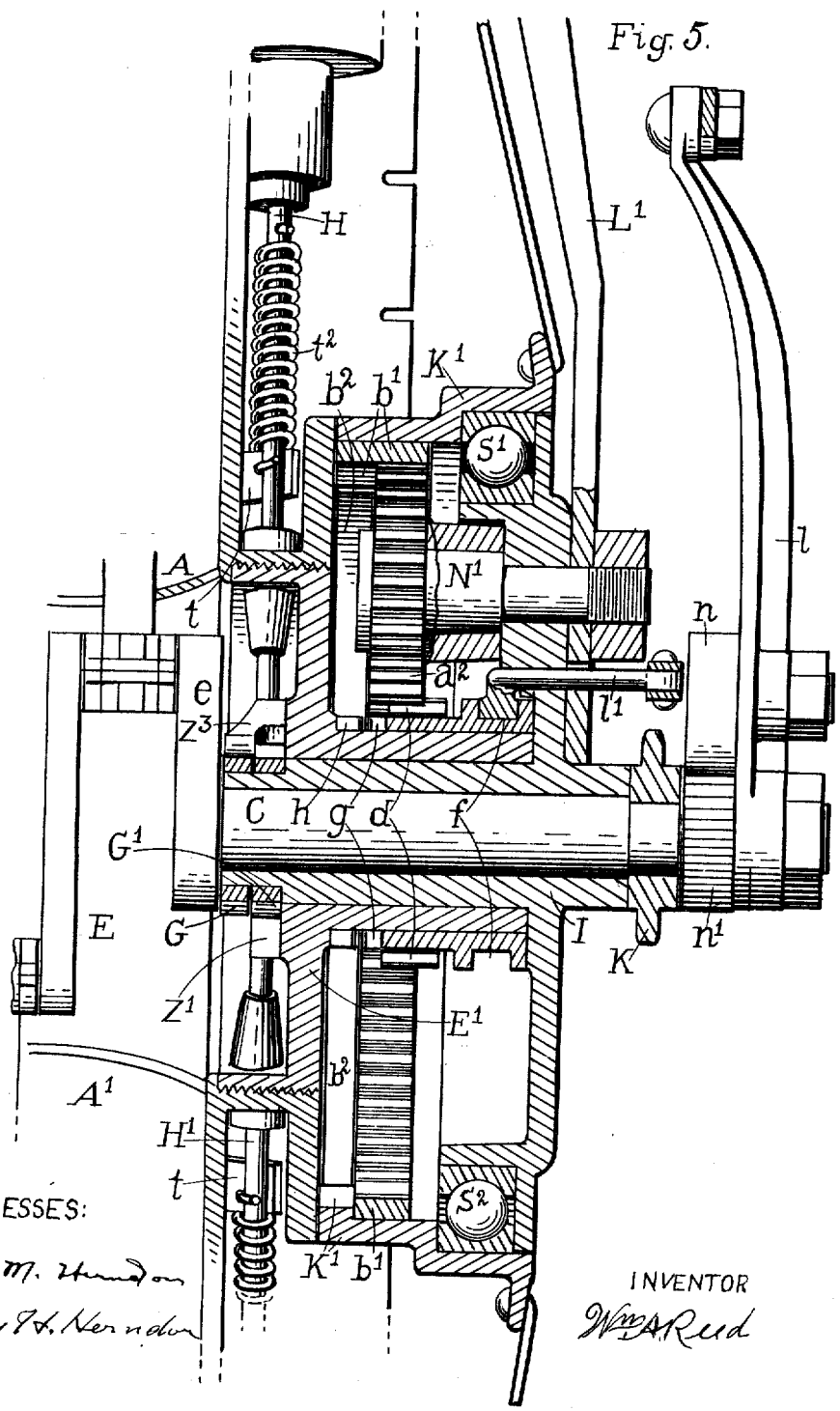

WILLIAM A. REED, OF LOS ANGELES, CALIFORNIA.

ROTARY ENGINE.

1,115,569.  Specification of Letters Patent.  Patented Nov. 3, 1914.

Application filed August 12, 1912. Serial No. 714,680.

*To all whom it may concern:*

Be it known that I, WILLIAM A. REED, a citizen of the United States, residing at Los Angeles, in the county of Los Angeles and State of California, have invented a new and useful Rotary Engine, of which the following is a specification.

My invention relates to a motor vehicle and consists in the improvement hereinafter described and shown in the accompanying drawings.

Figure 1 is a cross section on line $x^2$ of Fig. 2. Fig. 2 is an elevation, the upper part sectioned on line $x^1$ of Fig. 3, a portion of the lower part sectioned on line $x$ of Fig. 3, showing the interior of the crank case, mufflers, conduits, cams and rocker-lifts for the operation of the valves. Fig. 4 is an elevation of the transmission clutch and shock absorber showing the manner in which the motion of the rotary engine is transmitted to the driving wheel of which the engine forms the hub, they both revolving on a common axis. Fig. 5 is a cross section on a larger scale of a portion of Fig. 1 showing the cams, valves and mechanism for transmitting the motion of the cylinders to the driving wheel and manner of cranking the engine.

In the drawings a rotary four-cycle type of engine is shown mounted in and geared to turn a wheel. A rotary two-cycle type may also be used with the same transmission.

In the operation of the engine shown in the drawings, C (Fig. 1) is a crank shaft journaled in the stationary members I and $I^1$ bearing opposed cranks $e$ and $e^1$, which are by rods D and $D^1$ connected to pistons B and $B^1$ in opposed cylinders A and $A^1$ which are integral with the crank case E which is journaled on stationary members I and $I^1$. Wall $E^1$ of the crank case E is threaded in to facilitate assembling the parts of the engine.

Fixed to the crank shaft C (Fig. 1) is the gear $d^1$ in mesh with the gear $a$ fixed on the idler shaft N which is journaled in the stationary member $I^1$. Fixed to the other end of the shaft N is the gear $a^1$ in mesh with the internal gear $b$ which is fixed to the outer wall of the crank case E, so that any motion that is imparted to the crank case E will produce an equal motion in an opposite direction to the crank shaft C, and give two inward and two outward movements to the pistons B and $B^1$ in each revolution of the cylinders A and $A^1$, thereby making the four cycles for each cylinder in each of their revolutions around the crank shaft C. In the crank shaft C is the conduit $C^1$ having a journaled communication with the carbureter R which is fixed in the stationary member $I^3$. At each outward movement of the pistons B and $B^1$ gas is drawn from the carbureter R through the conduit $C^1$, check valve M into the crank case E. Leading from the crank case E (Fig. 2) along the outer wall of the cylinder A is the conduit $F^3$ communicating through the valve $H^3$ into the outer end of the cylinder A for the intake of gas from the crank case E.

Opposite from the conduit $F^3$ is the conduit $F^2$ leading from the outer end of the cylinder A through the valve $H^1$ along the outer wall of the cylinder A into the muffler U for the outlet of exhaust gas from the cylinder A, the muffler U being around the outer wall of the crank case E between the cylinders A and $A^1$, the muffler U having suitable openings for the outlet of exhaust gas into the surrounding air. The cylinder $A^1$ is equipped in a like manner as described for the cylinder A. Fixed on the stationary member I inside the crank case E are the cams G and $G^1$ which operate the rockers $Z^2$ and $Z^3$, which lift the valves $H^1$ and $H^3$ from their seat at the proper time for the intake and exhaust of gas, once in each revolution of the cylinder A around said stationary cams. The cylinder $A^1$ following the cylinder A in its revolution, its valves pass through a like operation as described for the valves of the cylinder A. To counter-balance the valve H against its centrifugal force is the centerweight $t$ having light and heavy ends between which it is pivoted to the cylinder A, its light end engaging the valve stem H as shown in Fig. 2, valves $H^1$, $H^2$ and $H^3$ being equipped in a like manner as valve H.

The sprocket K is fixed to the crank shaft C to drive the magneto, not shown.

On the end of the crank shaft C is journaled the lever $l$ having the pawl $n$ which engages the ratchet $n'$ fixed to the crank shaft C. The lever $l$ is connected by rod convenient to the foot or hand of the operator, and said rod cranks the engine by a series of pulls of the lever $l$. Or the ordinary crank for starting gas engines may be used on the end of the crank shaft C in place of the lever $l$, pawl $n$ and ratchet $n'$.

To transmit the motion of the cylinders A and $A^1$ to the hub $K^1$ of the wheel P are the clutch lugs $h$ (Fig. 5) on the crank case $E^1$, which engage with the clutch lugs $g$ on the gear sleeve $d$ which is journaled on the crank case $E^1$. In the gear sleeve $d$ is the groove $f$ revoluble on the shifter $l^1$ which is movable longitudinally in the stationary member I. The shifter $l^1$ is connected by a lever (not shown) convenient to the foot or hand of the operator. The gear sleeve $d$ is in mesh with the idler gear $a^2$ journaled on the stud $N^1$ which is fixed to the stationary member I. The gear $a^2$ is in mesh with the internal gear $b^1$ mounted movably in the wheel hub $K^1$. Integral with the internal gear $b^1$ (Fig. 4) are the projections $b^4$, which abut against the projections $K^3$, integral with the wheel hub $K^1$, the opposite side of the projections $b^4$ abut against the springs $b^2$ and $b^3$ which at their other ends abut against the projections $K^3$ integral with the wheel hub $K^1$. Starting from the position of the mechanism shown in Fig. 5 the lug $h$ on $E^1$ being in motion, the gear sleeve $d$ being at rest and in mesh with the idler gear $a^1$ which is in mesh with the internal gear $b^1$ in the hub $K^1$, the operator by the shifter $l^1$ moves the gear sleeve $d$ longitudinally on the casing $E^1$, thereby throwing the lugs $h$ and $g$ in mesh. The shock of starting the transmission mechanism into motion will be transmitted through the gear $d$, gear $a^2$, internal gear $b^1$ to the lugs $b^4$. The lugs $b^4$ and $K^3$ will then move from each other against the tension of the springs $b^2$ and $b^3$ which will move into curves of shorter radius until sufficient tension is given by the springs $b^2$ and $b^3$ to propel the wheel P attached to the hubs $K^1$ and K, thus giving the wheel P a constant elastic drive on the ball bearings S, $S^1$, $S^2$, $S^3$, which are supported on the stationary members I and $I^1$. The cylinders A and $A^1$ having at their outer ends the spark plugs $r$ and $r^1$. $O^2$ and $O^4$ are the terminals from the spark plugs $r$ and $r^1$. $O^3$ is the terminal of the electric conductor (not shown). $O^5$ is a circle of insulating material fixed on the spokes of the wheel P, through which, at six equal spaces around its center, are fixed the terminals O and $O^1$. Inclosing the engine are the circular walls V, $V^1$ and $V^2$ in which are openings for the circulation of air indicated by arrows, the exhaust going out with the air at the periphery openings of said walls. The cylinders A and $A^1$ are geared to revolve three times to one revolution of the wheel P. L and $L^1$ are fixed to the stationary members I and $I^1$ and represent the rear fork of a motor cycle.

The transmission lugs $g$ and $h$ are so formed that they can only mesh at one point in their revolution, thereby insuring the contact of the terminals $O^2$, $O^4$, O, $O^1$, and $O^3$ at predetermined times in the revolution of the cylinders A, $A^1$ and wheel P; the terminal $O^2$ from the spark plug $r^1$ and the terminal $O^3$ making contact simultaneously with three of the alternate terminals O and $O^1$ in each revolution of the wheel P; the terminal $O^4$ from the spark plug $r$ and terminal $O^3$ making contact simultaneously with the other alternate terminals O and $O^1$ in each revolution of the wheel P, thus receiving six power impulses in each revolution of the wheel P.

To start the engine one of the terminals of the wheel P is placed in contact with the terminal $O^3$. A circular or part circular movement is given to the lever $l$ which rotates the shaft C and casing E equally in opposite directions. The first outward movement of the pistons B and $B^1$ will draw fuel from the carbureter R through the conduit $C^1$ and check valve $m$, filling the crank case E with fuel. Now starting from the position shown in Figs. 5 and 2. The cylinder A turning to the left, the cam G will unseat the valve $H^3$, (Fig. 2) of the cylinder A, while the cylinder A is passing its first quarter revolution the pistons B and $B^1$ will make their movement inward, closing the valve $m$ and filling with some pressure the cylinder A with fuel from the crank case E. The valves $H^1$ and $H^3$ will be closed while the cylinder A passes over its second quarter revolution, the pistons B and $B^1$ will make their outward movement, drawing fuel from the carbureter R through the conduit $C^1$ and check valve $m$ into the crank case E. The piston B will compress the fuel in the cylinder A and at the completion of this second quarter revolution, the terminal $O^4$ will make and break contact with the terminal $O^1$ and fire the compressed fuel in the cylinder A. The cylinder A now passes over its third quarter on the power impulse given at its beginning, the pistons B and $B^1$ making their inward movement. At the beginning of the fourth quarter revolution of the cylinder A, the cam G will open the valve $H^1$, and while passing over this quarter the piston B and $B^1$ will make their outward movement, the piston B pushing the products of combustion through the valve $H^1$, and conduit $F^2$ into the muffler U, which allows it to gradually escape into the air during its whole revolution. The cylinder $A^1$ follows in revolution and performs the same operation described for the cylinder A.

T and $T^1$ are the oil supplies communicating with the conduits $w$ and $w^1$ which supply oil to the bearing parts, the oil entering the case E and by centrifugal force will lubricate the bearings of the cranks $e$ and $e^1$, the bearings of the rods D and $D^1$, then through the several conduits $p$ and $p^1$, in the pistons B and B¹ to the walls of the cylinders A and A¹.

Now the engine being in operation to start in revolution the wheel P, in which the engine is mounted, the operator by the shifter $l^1$ (Fig. 5) moves the gear sleeve longitudinally, thereby meshing the lugs $g$ and $h$.

I claim:—

1. In a motor vehicle a rotary explosion engine and a wheel, said engine and said wheel journaled on a relatively stationary member and on a common axis, said stationary member bearing an idler gear, said will of the operator, said idler gear in mesh with said idler gear, said engine bearing a clutch to engage said journaled gear at the will of the operator, said idler gear in mesh with an internal gear journaled in the hub of said wheel and movable against the tension of a spring or springs attached to and adapted to revolve said wheel.

2. In a motor vehicle a rotary explosion engine and a wheel, said engine and said wheel journaled on a relatively stationary member and on a common axis, said engine bearing spark plug terminals, said wheel and said stationary member bearing electrical terminals, said spark plug terminals and said wheel terminals at predetermined times in their revolutions being adapted to make and break simultaneous contact with said stationary member electric terminal.

WILLIAM A. REED.

Witnesses:
OSCAR TANDLER,
FRED WILLIAM REED.

Correction in Letters Patent No. 1,115,569.

It is hereby certified that in Letters Patent No. 1,115,569, granted November 3, 1914, upon the application of William A. Reed, of Los Angeles, California, for an improvement in "Rotary Engines," an error appears in the printed specification requiring correction as follows: Page 3, strike out lines 10-22, comprising claim 1, and insert the following:

*1. In a motor vehicle a rotary explosion engine and a wheel, said engine and said wheel journaled on a relatively stationary member and on a common axis, said stationary member bearing an idler gear, said engine bearing a journaled gear in mesh with said idler gear, said engine bearing a clutch to engage said journaled gear at the will of the operator, said idler gear in mesh with an internal gear journaled in the hub of said wheel and movable against the tension of a spring or springs attached to and adapted to revolve said wheel.;* and that the said Letters Patent should be read with this correction therein that the same may conform to the record of the case in the Patent Office.

Signed and sealed this 15th day of December, A. D., 1914.

[SEAL.]

J. T. NEWTON,
*Acting Commissioner of Patents.*